Jan. 12, 1937. W. McKENZIE 2,067,856
STONE SAWING MACHINE
Filed Oct. 16, 1935
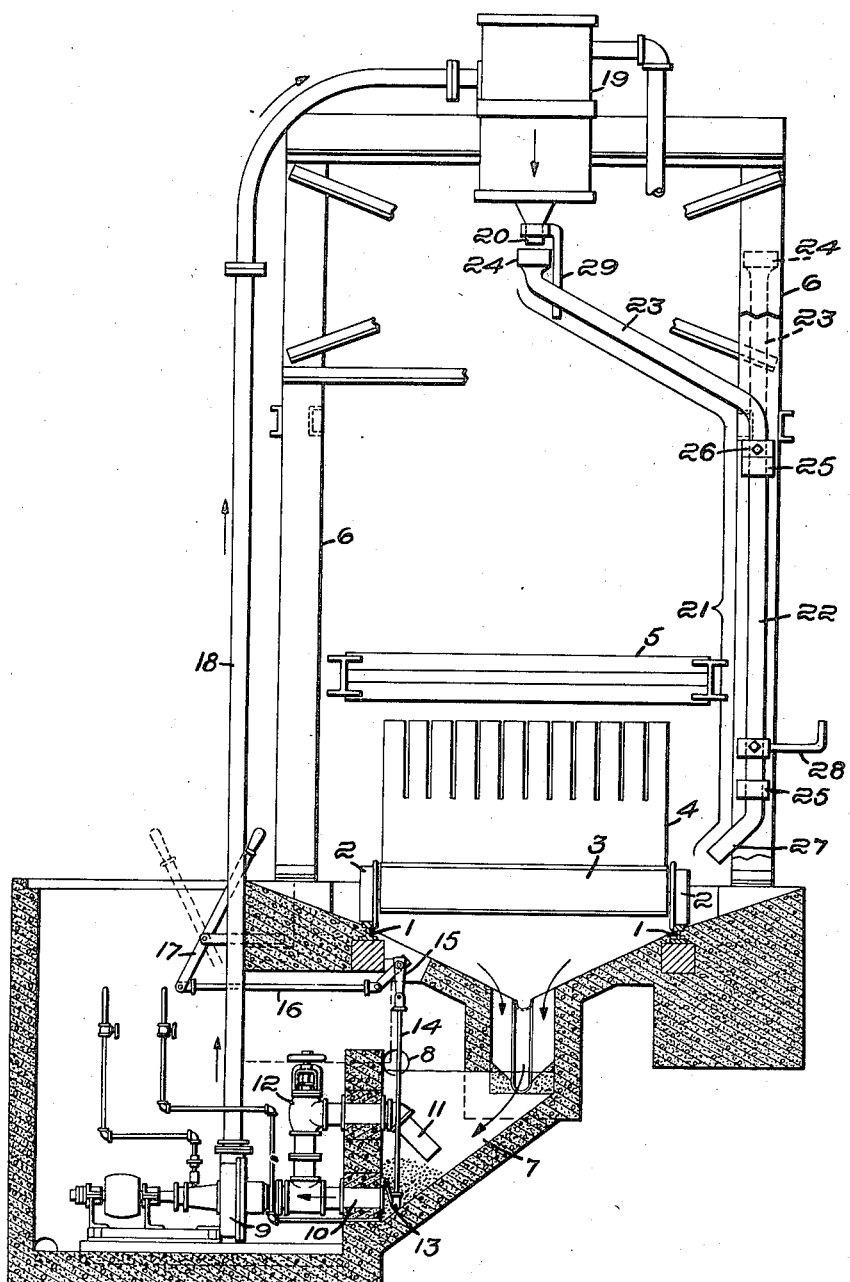
Inventor:
William McKenzie Patented Jan. 12, 1937

2,067,856

UNITED STATES PATENT OFFICE 2,067,856

STONE SAWING MACHINE

William McKenzie, Stonington, Maine

Application October 16, 1935, Serial No. 45,240

7 Claims. (Cl. 125—12)

This invention relates to stone sawing machines, and is concerned with the handling of the water and the shot or abrasive supplied to the saws and the work. The invention aims to provide a by-pass arrangement by which the normal circulation of water and shot or abrasive may be interrupted when, for any reason, the machine is stopped, as when the motor fuse blows, or it appears that it might blow, or when the work is completed, or when the machine is to be shut down for the night.

By the use of the by-pass, the discharge of water and shot onto the work may be stopped instantly and diverted through the by-pass to the hopper, after which the circulation of water and shot will continue through the by-pass until it is desired to restore the normal circulation. If the machine is to be shut down, an independent supply of water under pressure may be used to wash the saws and the stone and to free them of mud and any remaining shot. In the morning, after the machine has been shut down for the night, the circulation of water alone is started and afterward the shot are started. When the shot are running evenly, the saws can be started and will run well within five minutes instead of the fifteen or twenty minutes required with former methods of handling.

The invention will best be understood by reference to the following description when taken in connection with the accompanying drawing of one specific embodiment thereof, while its scope will be pointed out more particularly in the appended claims.

The single figure of the drawing illustrates an application of the invention to a known stone sawing machine.

Referring to the drawing, and to the embodiment of the invention illustrated therein by way of example, there is shown a stone sawing machine comprising rails 1 for wheels 2 of a carriage 3 which supports a block 4 of stone, above which is a sash 5 to carry a gang of saws (not shown). In practice, the sash is reciprocated horizontally and is raised and lowered as usual. A frame 6 is provided, as usual, for the operating mechanism.

There are various known ways of handling the water and the shot. One is by the use of a bucket conveyor. Another is by the use of a circulating system including a pump, usually of the centrifugal type which elevates the water and shot to a container discharging onto the saws and the stone. A gathering pit or hopper collects the water and shot which are then re-circulated by the pump. It is to this latter type of handling apparatus that the present embodiment of my invention is applied, although it is susceptible of other applications.

Referring to the drawing, there is shown a gathering pit or hopper 7 in which water is maintained at the level shown by an overflow pipe 8. Beside this pit is a centrifugal pump 9 communicating with the pit by a direct suction pipe 10 and an indirect suction pipe 11, the latter being controlled by a valve 12 and the former by a trap or gate 13 controlled by mechanism including a link 14, a bell-crank lever 15, a link 16 and a hand lever 17. When the trap or gate 13 is closed and the valve 12 is open, water only is drawn from the pit or hopper, and when, on the other hand, the valve 12 is closed and the trap or gate 13 is open, water and shot are drawn from the pit.

The pump discharges through a pipe 18 to an elevated container or tank 19 supported by the frame 6 and having an outlet 20 which discharges upon the saws and the stone, whence the water and shot gravitate to the pit to be recirculated. To the system, as thus constituted, I have applied a by-pass arrangement, the one shown by way of example comprising a by-pass pipe 21 so arranged that it may be availed of instantly to divert the water and shot so that the same shall return to the pit without falling upon the work.

In the example shown, the pipe 21 has a vertical portion 22 disposed laterally of the container outlet 20, and an offset portion 23 having an inlet 24 which is movable laterally into and out of position to receive the discharge from the container. This is conveniently accomplished in the present instance by mounting the vertical portion 22 of the pipe in one or more bearings 25 to turn about a vertical axis. A collar 26, fixed on the pipe, supports the latter on the upper bearing. The bearings are suitably affixed to the frame. The pipe has an outlet 27 discharging toward the pit. The pipe can be swung about its vertical axis by appropriate means such as a handle 28 suitably affixed to the pipe. A suitably arranged stop 29, herein affixed to the container 19 and extending downwardly into the path of the offset portion 23, limits the swinging movement of the latter in one direction and locates the inlet 24 with relation to the outlet 20 of the container 19.

The operation of the by-pass will be evident without further description, it being understood, of course, that in the normal operation of the machine, the offset portion 23 occupies some such position as that shown in dotted lines, and that if the machine should stop intentionally or unintentionally, an operator grasps the handle 28 and turns the by-pass pipe into the position shown in full lines. The circulation may then be continued by way of the by-pass during a temporary shut-down of the machine. If the machine is to be shut down for a long period, as over-night, all of the shot are returned to the pit, for which purpose the trap or gate 13 will be closed. Water under high pressure supplied through a hose may then be used to wash the saws and the stone and to clear them of accumulations of mud and shot. It should be emphasized that the operation of the by-pass is instantaneous and it can be availed of without delay in the event of stoppage or threatened stoppage of the machine due to overload.

Having thus described one embodiment of the invention, but without limiting myself thereto, what I claim and desire, by Letters Patent, to secure is:

1. In an apparatus for handling water and shot or abrasive material in connection with a stone sawing machine, the combination of a circulating system including a hopper for water and shot or abrasive, an elevated container having an outlet normally discharging upon the work, means for elevating water and shot or abrasive from said hopper to said container, and a by-pass pipe having an inlet which is movable into and out of position to receive the discharge from said container, and having an outlet which discharges toward said hopper.

2. In an apparatus for handling water and shot or abrasive material in connection with a stone sawing machine, the combination of a circulating system including a hopper for water and shot or abrasive, an elevated container having an outlet normally discharging upon the work, means for elevating water and shot or abrasive from said hopper to said container, and a by-pass pipe having a portion disposed laterally of said outlet, an offset portion having an inlet which is movable laterally into and out of position to receive the discharge from said container, and an outlet which discharges toward said hopper.

3. In an apparatus for handling water and shot or abrasive material in connection with a stone sawing machine, the combination of a circulating system including a hopper for water and shot or abrasive, an elevated container having an outlet normally discharging upon the work, means for elevating water and shot or abrasive from said hopper to said container, and a by-pass pipe having a vertical portion disposed laterally of said outlet, a laterally swinging offset portion having an inlet which is movable laterally by swinging said offset portion to receive the discharge from said container, and an outlet which discharges toward said hopper.

4. In an apparatus for handling water and shot or abrasive material in connection with a stone sawing machine, the combination of a circulating system including a hopper for water and shot or abrasive, an elevated container having an outlet normally discharging upon the work, means for elevating water and shot or abrasive from said hopper to said container, and a by-pass pipe having a vertical portion disposed laterally of said outlet and mounted to turn about a vertical axis, an offset portion which is carried laterally by turning said vertical portion about said axis and which has an inlet to receive the discharge from said outlet when said offset portion is moved to bring said inlet below said outlet, and an outlet which discharges toward said hopper.

5. In an apparatus for handling water and shot or abrasive material in connection with a stone sawing machine, the combination of a circulating system including a hopper for water and shot or abrasive, an elevated container having an outlet normally discharging upon the work, means for elevating water and shot or abrasive from said hopper to said container, a bearing disposed laterally of said outlet, a by-pass pipe having a vertical portion supported by and turning in said bearing about a vertical axis, an offset portion which is carried laterally by turning said vertical portion in said bearing, and which has an inlet to receive the discharge from said outlet when said offset portion is moved to bring said inlet below said outlet, and an outlet which discharges toward said hopper, and means for turning said vertical portion in said bearing.

6. In an apparatus for handling water and shot or abrasive material in connection with a stone sawing machine, the combination of a circulating system including a hopper for water and shot or abrasive, an elevated container having an outlet normally discharging upon the work, means for elevating water and shot or abrasive from said hopper to said container, a bearing disposed laterally of said outlet, a by-pass pipe having a vertical portion supported by and turning in said bearing about a vertical axis, an offset portion which is carried laterally by turning said vertical portion in said bearing, and which has an inlet to receive the discharge from said outlet when said offset portion is moved to bring said inlet below said outlet, and an outlet which discharges toward said hopper, means for turning said vertical portion in said bearing, and means to limit the turning of said pipe in one direction and locate said inlet with relation to said outlet of said container.

7. In apparatus for handling abrading material and liquid in connection with a stone working machine, the combination of a supply system including an elevated container normally supplying abrading material and liquid to the work, means for supplying abrading and liquid to said container, and a by-pass pipe having an inlet which is movable into and out of position to receive the discharge of abrading material and liquid from said container and to discharge the same extraneously of the work.

WILLIAM McKENZIE.